United States Patent
Karlov

(10) Patent No.: US 8,934,626 B2
(45) Date of Patent: Jan. 13, 2015

(54) METHOD TO MANAGE REVOCATIONS IN A GROUP OF TERMINALS

(75) Inventor: Alexandre Karlov, Meyrin (CH)

(73) Assignee: Nagravision S.A. (CH)

( * ) Notice: Subject to any disclaimer, the term of this patent is extended or adjusted under 35 U.S.C. 154(b) by 267 days.

(21) Appl. No.: 13/520,771

(22) PCT Filed: Mar. 1, 2011

(86) PCT No.: PCT/EP2011/052974
§ 371 (c)(1),
(2), (4) Date: Jul. 5, 2012

(87) PCT Pub. No.: WO2011/107451
PCT Pub. Date: Sep. 9, 2011

(65) Prior Publication Data
US 2012/0281833 A1    Nov. 8, 2012

(30) Foreign Application Priority Data
Mar. 3, 2010 (EP) .................................... 10155398

(51) Int. Cl.
*H04L 9/00* (2006.01)
*G06F 21/10* (2013.01)
*H04L 9/08* (2006.01)
*H04N 7/167* (2011.01)

(52) U.S. Cl.
CPC ............. *G06F 21/10* (2013.01); *H04L 9/0833* (2013.01); *H04N 7/1675* (2013.01); *H04L 9/0836* (2013.01); *H04L 2209/601* (2013.01); *G06F 2221/0753* (2013.01)
USPC ............... 380/44; 380/28; 380/270; 380/271; 380/277; 713/162; 726/26

(58) Field of Classification Search
CPC ................ H04L 9/0833; H04L 9/0836; H04L 2209/601; H04N 7/1675; G06F 21/10
USPC ........ 380/28–30, 44, 270, 271, 277; 713/162; 726/26
See application file for complete search history.

(56) References Cited

U.S. PATENT DOCUMENTS 8,306,220 B2 * 11/2012 Junod et al. ..................... 380/44
8,437,476 B2 *  5/2013 Agagliate et al. ............. 380/278

(Continued)

OTHER PUBLICATIONS

"PCT/EP2011/052974 Search Report and Written Opinion mailed Jun. 24, 2011", 8 pgs.

(Continued)

*Primary Examiner* — Brandon Hoffman
*Assistant Examiner* — Jayesh Jhaveri
(74) *Attorney, Agent, or Firm* — Schwegman Lundberg & Woessner, P.A.

(57) ABSTRACT

The present invention concerns the field of broadcast encryption method, i.e. a method to organize the distribution of keys into a group of users so that it is possible to manage the revocation of one member of the group in an efficient way. The proposed solution is a private encryption key ciphertext constant collusion-resistant broadcast encryption. The main idea behind the invention is to mix the notion of efficient tree-based key derivation (also called subset management) with individual and personalized key blinding thus achieving a full collusion-resistant broadcast encryption system. The key de-blinding is performed at the last moment thanks to a cryptographic technique called pairings (also known as bilinear maps) resulting in a global key commonly shared by all authorized (non-revoked) devices. It should be noted that only non-revoked devices can compute the final key (this is achieved through subset management and related subset key derivation technique) and perform the de-blinding (which is performed with one pairing).

5 Claims, 1 Drawing Sheet

(56) References Cited

U.S. PATENT DOCUMENTS

| | | | |
|---|---|---|---|
| 2002/0133701 A1* | 9/2002 | Lotspiech et al. | 713/163 |
| 2003/0142826 A1* | 7/2003 | Asano | 380/277 |
| 2005/0210014 A1* | 9/2005 | Asano | 707/3 |
| 2008/0085005 A1* | 4/2008 | Jung et al. | 380/282 |
| 2008/0192939 A1* | 8/2008 | Lotspiech et al. | 380/279 |
| 2010/0074438 A1* | 3/2010 | Wang et al. | 380/44 |
| 2010/0208895 A1* | 8/2010 | Boneh et al. | 380/278 |

OTHER PUBLICATIONS

Yu, Shucheng, et al., "Attribute-based on-demand multicast group setup with membership anonymity", Computer Networks 54, (2010), 377-386.

Boneh, Dan, et al., "Collusion Resistant Broadcast Encryption With Short Ciphertexts and Private Keys", CRYPTO 2005, (2005), 19 pgs.

Naor, Dalit, et al., "Revocation and Tracing Schemes for Stateless Receivers", CRYPTO 2001, (2001), 34 pgs.

* cited by examiner

METHOD TO MANAGE REVOCATIONS IN A GROUP OF TERMINALS

RELATED APPLICATIONS

This application is a U.S. National Stage filing under 35 U.S.C. 371 from International Patent Application Serial No. PCT/EP2011/052974, filed Mar. 1, 2011, and published on Sep. 9, 2011 as WO 2011/107451 A1, which claims the priority benefit of EP Application No. 10155398.0, filed Mar. 3, 2010, the contents of which are incorporated herein by reference in their entirety.

INTRODUCTION

The present invention concerns the field of broadcast encryption method, i.e. a method to organize the distribution of keys into a group of users so that it is possible to manage the revocation of one member of the group in an efficient way.

THE PROBLEM

The problem considered here is how to efficiently control access to broadcast content for a large population of subscribers using only the one-way broadcast feed as a communication channel via a key-based access control only.

BASIC APPROACH

The natural solution to this problem is to encrypt the controlled asset (e.g. TV channel) with a unique key and give this key only to those subscribers who have paid for the service.

This works fine until the subscriber decides to cancel his subscription, at which point the key must be erased from that user's terminal.

This is essentially impossible in practice since sending a Cancel message to each cancelled subscriber requires bandwidth proportional to the number of cancelled subscribers and requires a high repetition rate to have any chance of being effective, which further increases the bandwidth requirements, to the point where it becomes simply impractical.

Moreover, a dishonest user may always filter those messages or make a copy of the key and continue using it after canceling his subscription.

Thus, in order to exclude a subscriber, the key must be revoked and a new key must be used instead. This requires however to send this new key to all remaining subscribers so that those paying for the service may still have access once the key changes.

This problem has been tackled in academia under the notion of broadcast encryption. However, state-of-the art broadcast encryption schemes are inadequate for Pay TV, either because of ciphertext linearly growing with the number of revoked users [2], or because of the decryption keys linearly depending on the number of users in the system [1].

EFFICIENCY PROBLEMS

The challenge is to find a way to send this same key-renewal message to all subscribers except those who have cancelled their subscriptions, which usually represent a small percentage of the total population.

Sending an individual message to each subscriber over the broadcast feed requires bandwidth that is proportional to the subscribers population, which quickly represents too much bandwidth for a viable operation.

Thus some form of global message must be used. Such a message may contain addressing information that indicates to the receiver whether it is a valid recipient of the message. However, the protection layer on the message is necessarily done with a secret shared by all the subscribers and thus any terminal is capable of decrypting it and retrieving the new key carried in it regardless of whether the message is addressed to it or not. This means that the terminal is ultimately trusted not to make use of the key if not entitled to, which is not acceptable since the terminal is not trusted.

BRIEF DESCRIPTION OF THE INVENTION

The present invention proposes a method for providing broadcast encryption for a group of n receivers, the said method using a key generation engine, an encryption engine and a decryption engine, and comprising the steps of:
  a. Generating by the key generation engine a random $g \in G$, where G is a prime order group of order p, a random secret value $\beta \in Z/pZ$ and n blinding values $s_u \in Z/pZ$ and for $i=1, K, 2^{n-1}-2$ generating pairs of values $a_i, b_i$.
  b. Generating by the key generation engine the plurality of decryption keys, each of the said decryption keys uniquely associated with the receiver's identity i by means of the blinding value $s_u$, the said decryption key computed using the blinding value, the generator and the pairs of values $a_i, b_i$ comprising of at least log n elements of group G and comprising of at least 2*(log n−2) elements of Z/pZ.
  c. For a subset R of revoked receivers among the total population of n receivers, generating by the encryption engine a random value $t \in Z/pZ$, computing by the key generation engine the value $$V = \prod_{i \in R} g^{\{path_i\}}$$

wherein i represents the identity of a receiver and $\{path_i\}$ is a product of at most log n values $a_i$ and $b_i$, generating by the encryption engine the cryptogram $hdr=(hdr_1, hdr_2)$ comprising of at least two elements of group G using the value V, the random value t and group generator g and generating the session key SK, wherein the said session key or parts thereof is used to derive a symmetric key, encrypt the payload, or to encrypt the payload with the said symmetric key.

BRIEF DESCRIPTION OF THE FIGURES

The present application will be better understood thanks to the attached figures, in which.

DETAILED DESCRIPTION OF THE INVENTION

The proposed solution is a private encryption key ciphertext constant collusion-resistant broadcast encryption. The main idea behind the invention is to mix the notion of efficient tree-based key derivation (also called subset management) with individual and personalized key blinding thus achieving a full collusion-resistant broadcast encryption system. The key de-blinding is performed at the last moment thanks to a cryptographic technique called pairings (also known as bilinear maps) resulting in a global key commonly shared by all authorized (non-revoked) devices. It should be noted that only non-revoked devices can compute the final key (this is achieved through subset management and related subset key derivation technique) and perform the de-blinding (which is performed with one pairing).

It should be also noted that this method is attractive because of:
- Constant size ciphertext—no matter how many devices are revoked, the bandwidth usage will be always the same (i.e. constant)
- Receiver storage—thanks to the tree-based key derivation (using one-way functions), the receiver is required to store only log n keys, where n is the total number of receivers. In fact, this is an improving compared, for instance to NNL scheme, where the receiver is required to store log^2 n keys.
- Decryption complexity—the flexibility of the scheme comes at some cost, since a pairing operation is expensive in terms of computation. However, no matter how many devices are revoked, only 2 such operations are required.

The idea of the invention can be briefly described using following two figures. At the deployment, the broadcaster selects a generator g in a group G of primer order p. It also selects a random secret value $\beta \in Z/pZ$ and n blinding values $s_u \in Z/pZ$. Then, for $i=1,K,2^{n-1}-2$ it generates $a_i,b_i$. It then distributes $g^{\beta+s_u}$ and the values according to the user "tree" (see FIG. 2) resulting in log n key values per receiver. The secret encryption key is $\beta$.

Figure 1:
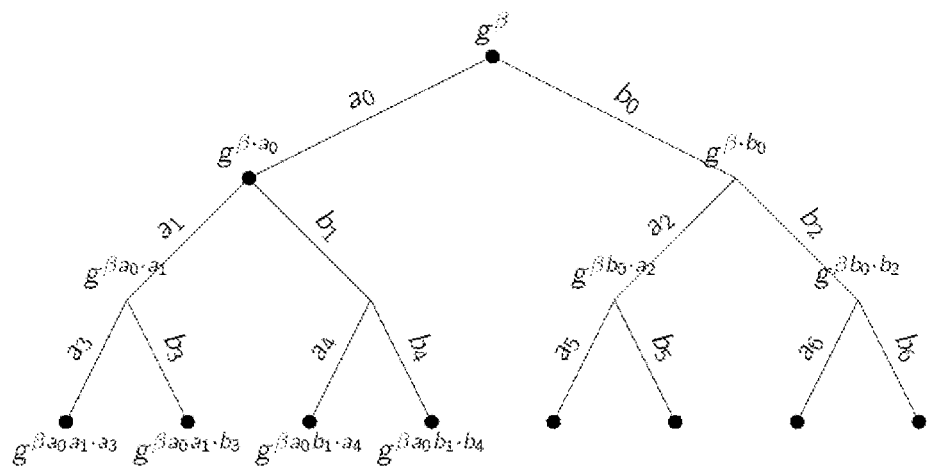
FIG. 1 illustrates a Broadcaster tree of keys
Figure 2:
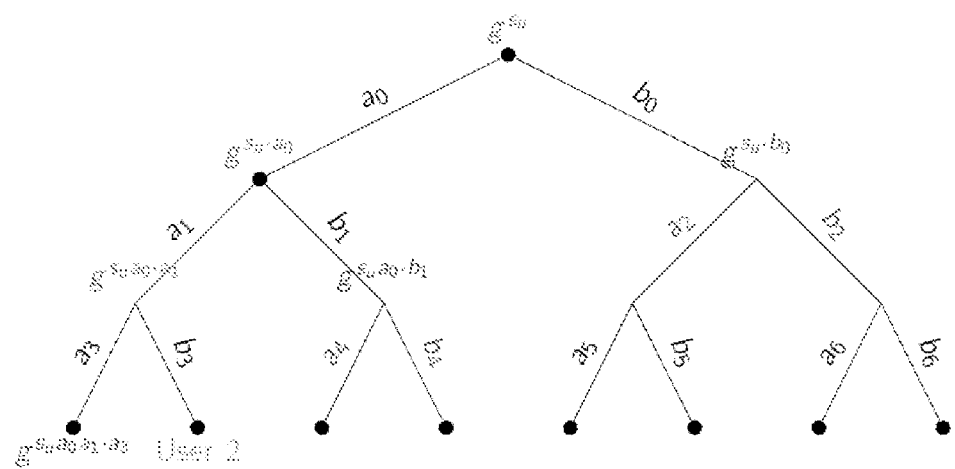
FIG. 2 illustrates the User keys

It should be noted that, for instance in the example of FIG. 2, the User 2 will have the following decryption key:

$$DK_{User2}=(g^{s_u a_0 a_1 a_3},(g^{s_u a_0 b_1},a_4,b_4),(g^{s_u b_0},a_2,b_2),g^{\beta+s_u})$$

The encryption procedure is as following:

We define as $\{path_i\}$ the exponent "path" from the root to the node i (see FIG. 2). For example for User2, it will be $a_0 a_1 b_3$. We compute the value $$V = \prod_{i \in R} g^{\{path_i\}}$$

where R is the set of all revoked devices. We then pick a random $t \in Z/pZ$ and we compute the ciphertext value as $$C=(V^t,g^t)$$

We encrypt the useful load with the session key $$SK = e(g^\beta, V)^t = e(g, g)^{\beta t \Sigma_{i \in R}\{path_i\}}$$

and broadcast C. The function e(.,.) is called a bilinear map or cryptographic pairing function and its properties and efficient implementations are well known in the art.

The decryption works as follow:

Any authorized terminal i (i.e. $i \notin R$) can compute the session key as:

$$SK = \frac{e(g^{\beta+s_u}, C_0)}{e\left(\prod_{i \in R} g^{s_u\{path_i\}}, C_1\right)} = \frac{e(g,g)^{(\beta+s_u)t\Sigma_{i \in R}\{path_i\}}}{e(g,g)^{s_u t \Sigma_{i \in R}\{path_i\}}} = e(g,g)^{\beta t \Sigma_{i \in R}\{path_i\}}$$

It should be noted, that only authorized (i.e. non-revoked) receivers can compute the value $$\prod_{i \in R} g^{s_u\{path_i\}}.$$

It should be also noted that the authorized receiver has explicitly the keys required to compute $g^{s_u\{path_i\}}$ or can derive them from higher level keys (see FIG. 2). However, it should be appreciated that no non-authorized ($i \in R$) receiver can derive the required keys, nor it can derive it by collaborating with other revoked receivers (meaning that this scheme provides full collusion resistance).

REFERENCES

[1] Dan Boneh, Craig Gentry, Brent Waters: Collusion Resistant Broadcast Encryption with Short Ciphertexts and Private Keys. CRYPTO 2005
[2] Dalit Naor, Moni Naor, Jeffery Lotspiech: Revocation and Tracing Schemes for Stateless Receivers. CRYPTO 2001

The invention claimed is:

1. A method for providing broadcast encryption for a group of n receivers, the said method using a key generation engine, an encryption engine and a decryption engine, comprising:
   receiving a broadcast payload to be encrypted;
   generating by the key generation engine a random $g \in G$, where G is a prime order group of order p, a random secret value $\beta \in Z/pZ$ and n blinding values $s_u \in Z/pZ$, u being the receiver index and Z/pZ being a finite field of order p, and for $i=1, \ldots, 2^{n-1}-2$ generating pairs of values $a_i, b_i$,
   generating by the key generation engine a plurality of decryption keys, each of the plurality of decryption keys uniquely associated with a receiver's identity i by means of the corresponding blinding value $s_u$, corresponding to the receiver i, the decryption key computed using the blinding value $s_u$, the generation engine and the pairs of values $a_i, b_i$ comprising of at least log n elements of group G and comprising of at least 2*(log n−2) elements of Z/pZ, and
   for a subset R of revoked receivers among the group of n receivers, generating by the encryption engine a random value $t \in Z/pZ$, computing by the key generation engine a value $$V = \prod_{i \in R} g^{\{path_i\}}$$

wherein i represents the identity of a receiver and $\{path_i\}$ is a product of at most log n values $a_i$ and $b_i$, generating by the encryption engine a cryptogram hdr=(hdr$_1$,hdr$_2$) comprising of at least two elements of group G wherein hdr$_1$ and hdr$_2$ are two parts of the cryptogram using the value V, the random value t and group generator g and generating a session key SK, wherein the session key SK is computed by the encryption engine using a bilinear map as $$SK = e(g^\beta, V)^t = e(g,g)^{\beta t \Sigma_{i \in R}\{path_i\}};$$

and wherein a symmetric key is derived from the session key or parts of the session key, and encrypt the payload wit the symmetric key.

2. The method defined in claim 1 further comprising providing the decryption engine with the decryption key, providing the decryption engine with the cryptogram hdr=(hdr$_1$,hdr$_2$) comprising of at least 2 elements of the group G, and providing explicitly or implicitly the decryption engine with the subset of revoked receivers R.

3. The method defined in claim 1 further comprising determining whether the receiver's identity belongs to the subset R, and if no-computing by the decryption engine the value of the session key $$SK = \frac{e(g^{\beta+s_u}, hdr_1)}{e\left(\prod_{i \in R} g^{s_u\{path_i\}}, hdr_2\right)} = \frac{e(g,g)^{(\beta+s_u)t\Sigma_{i \in R}\{path_i\}}}{e(g,g)^{s_u t\Sigma_{i \in R}\{path_i\}}} = e(g,g)^{\beta t\Sigma_{i \in R}\{path_i\}}.$$

4. The method defined in claim 1 further comprising using the session key or parts thereof to derive a symmetric key, decrypt the payload, or to decrypt the payload with the said symmetric key.

5. The method defined in claim 1 wherein the said session key is computed using a bilinear map.

* * * * *

UNITED STATES PATENT AND TRADEMARK OFFICE
CERTIFICATE OF CORRECTION

PATENT NO. : 8,934,626 B2
APPLICATION NO. : 13/520771
DATED : January 13, 2015
INVENTOR(S) : Alexandre Karlov It is certified that error appears in the above-identified patent and that said Letters Patent is hereby corrected as shown below:

On the title page, item (57), in "Abstract", in column 2, line 1-2, delete "encryptionmethod," and insert --encryption method,--, therefor In the claims In column 5, line 2, in Claim 1, delete "wit" and insert --with--, therefor Signed and Sealed this
Twenty-seventh Day of October, 2015

Michelle K. Lee
*Director of the United States Patent and Trademark Office*